US006844546B2

(12) United States Patent
Nagano et al.

(10) Patent No.: US 6,844,546 B2
(45) Date of Patent: Jan. 18, 2005

(54) EXPLOSIVE DETECTION SYSTEM

(75) Inventors: Hisashi Nagano, Hachioji (JP); Yasuaki Takada, Kiyose (JP); Izumi Waki, Asaka (JP); Koushou Aikawa, Yokohama (JP); Masayuki Takizawa, Yokohama (JP); Shigenori Morishima, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/229,057

(22) Filed: Aug. 28, 2002

(65) Prior Publication Data

US 2003/0193019 A1 Oct. 16, 2003

(30) Foreign Application Priority Data

Apr. 15, 2002 (JP) ....................................... 2002-111468

(51) Int. Cl.[7] .................................................. G01N 1/22

(52) U.S. Cl. ........................ 250/289; 250/281; 250/282; 250/284; 250/288; 73/23.2; 73/863.12; 73/864.33

(58) Field of Search ................................. 250/281, 282, 250/284, 286, 287, 288, 423 F, 423 R, 289; 73/23.39, 23.41, 31.02, 863.11, 863.12, 863.21, 863.71, 864.81; 86/50; 436/28, 156

(56) References Cited

U.S. PATENT DOCUMENTS 5,345,809 A * 9/1994 Corrigan et al. ............. 73/23.2

* cited by examiner

*Primary Examiner*—John R. Lee
*Assistant Examiner*—David A. Vanore
(74) *Attorney, Agent, or Firm*—Antonelli, Terry, Stout & Kraus, LLP

(57) ABSTRACT

An explosive detection system including a sample injection region, an ion source region for generating ions of a sample injected by the ion injection region, a mass analysis region for analyzing mass of the ions, a heater for heating the sample injection region and the ion source region, a plurality of pumps for exhausting a chamber in which the mass analysis region is disposed, and a controller for controlling the regions and the plurality of pumps. The controller conducts control so as to heat the sample injection region and the ion source region with the heaters, then reduce heating electric power supplied to the heaters in order to prevent a predetermined electric power value from being exceeded, and drive the plurality of pumps successively to exhaust the chamber.

24 Claims, 5 Drawing Sheets

EXPLOSIVE DETECTION SYSTEM

BACKGROUND OF THE INVENTION

The present invention relates to a mass analysis system for detecting explosives, hazardous materials and narcotics.

As conventional art methods for effecting detection to determine whether there are explosives, hazardous materials and narcotics, there are chemiluminescence, ion mobility analysis, and mass spectrometry.

In the chemiluminescence, subject vapor is picked, temporarily adsorbed on a filter to concentrate. Then the vapor is heated to leave the filter and decomposed by using gas chromatographs, and reacted with a reagent to detect emission of light (first conventional art: U.S. Pat. No. 5,092,155).

In the ion mobility analysis, subject gas is absorbed in, adsorbed on a filter to concentrate, and heated to decompose. The subject gas is then ionized with a radioisotope contained in an ion source. The ions are injected into a drift tube, and the mobility of ions is detected (second conventional art: U.S. Pat. Nos. 4,987,767 and 5,109,691).

As a highly sensitive detection system capable of detecting an extremely small amount of trace, an atmospheric pressure chemical ionization source with counter-flow introduction has been reported (third conventional art: JP-A-2001-093461).

There is reported a mass analysis system that measures the temperature of an ion source is measured immediately after power turning on, and conducts control so as to start an exhaust device only in the case where its temperature is at least a predetermined preset value and so as not to start the exhaust device in the case where its temperature is lower than the preset value (fourth conventional art: JP-A-9-45277). In the fourth conventional art, the exhaust device is controlled in order to hold down damage such as oxidation the high temperature ion source suffers to the minimum.

There is reported a mass analysis system having control means for controlling exhaust means (exhaust means having a variable exhaust capability for vacuum-exhausting an analysis chamber) so as to lower the exhaust capability during an interval that an analysis is not being executed or during an interval that it is not necessary to maintain a high vacuum state and so as to raise the exhaust capability to restore the high vacuum state when a certain analysis is started (fifth conventional art: JP-A-2000-36283). It is described that the fifth conventional art has an effect that the electric power of the exhaust means as a whole can be reduced and the running cost can be saved.

In the method of the first conventional art, the subject substance is previously separated by using gas chromatograph. Therefore, the method is extremely high in sensitivity and selectivity with respect to a specific subject substance. However, it is necessary to temporarily collect and trap vapor from the subject substance, then carry the concentrated substance to a measurement device of installed type and effect detection. Furthermore, there is a problem that it is necessary to effect separation by using a gas chromatograph in order to raise the sensitivity and it takes time until detection.

In the method of the second conventional art, it is possible to detect a subject substance in a short time by collecting and trapping vapor from the subject substance with an absorber, concentrating the vapor, and then effecting decomposition again. Since all absorbed substances are ionized, however, the ionization efficiency of a specific substance is lowered and the detection sensitivity is low. Furthermore, there is a problem that separation in the drift tube is difficult and the selectivity is low.

The system of the third conventional art is capable of absorbing vapor from a subject substance on line, detecting the vapor with high sensitivity, and operating continuously. If a mass analysis system using an atmospheric pressure chemical ionization source is used as a detection system as in the third conventional art, then selective ionization of a specific substance is possible, and the sensitivity especially to a nitro-compound, which is a main component of explosives, is high. Thus, it is possible to detect at the room temperature plastic explosives, which has been conventionally difficult to detect in the gas state because of its low vapor pressure. Furthermore, since the sensitivity is extremely high, on-line detection can be achieved without using pre-processing, such as collection of the subject substance using a filter and concentration, and measurement in a short time is possible. Furthermore, by conducting pre-processing, the detection sensitivity is further improved and the subject substance can be detected.

The system of the third conventional art is basically installation type, and it can be applied to X-ray imaging detection systems and security gates. However, the system of the third conventional art has a problem that its application is difficult when detecting a doubtful article or when the necessity of an urgent detection inspection has occurred. In the case of such detection of a doubtful article, there is a problem that it takes time because vapor is acquired by using a small-sized absorption machine of vacuum cleaner type and measurement is conducted by a system of installation type. In other words, the merit of the system of installation type that an on-line measurement is possible cannot be made the most of.

At the time of emergency such as when a doubtful article has been found, it is necessary in an explosive detection system to rapidly determine whether the doubtful article is an explosive. Furthermore, it is desirable that an extremely small amount of trace can be detected with high sensitivity and high selectivity. In addition, it is desirable that the start time is as short as possible in order to be transportable, simply movable and then measurable rapidly.

On the other hand, for raising the detection sensitivity of a mass analysis system used in an explosive detection system that can cope with an emergent inspection, it is an important subject to lower the background caused by adsorption of the detection subject substance into pipe laying or adsorption of impurities. For preventing the background from rising, it becomes necessary to use a substance that is hard to absorb gas as a material of the pipe laying and heat the pipe laying.

However, there is a fear that the highest electric power will be exceeded when measurement start of a mass analysis system, start of an exhaust device and pipe laying heating start are simultaneously executed. Especially in the case of the exhaust device, electric power immediately after the start is high in many cases because of characteristics of the device. In the case where the above starts are executed simultaneously, therefore, the mass analysis system cannot be used with a typical home power supply. For making use of a typical home power supply possible, it is necessary to heat the pipe laying after starting the exhaust device and then sufficiently effecting the exhaust. Since in this case it takes an extremely long time for the pipe laying to arrive at a predetermined temperature as a result of pipe laying heating, the start time as a whole becomes long.

Furthermore, in a conventional mass analysis system serving as a chemical analysis system, it is necessary to bring mainly its ion source and detector to a high vacuum state. After a sufficient vacuum state has been reached, the temperature is raised. Especially when effecting an analysis of an extremely minute amount, it is desired to implement as high vacuum state as possible because mixture of impurities into the ion source is disliked. When the pipe laying is heated in the state of the atmospheric pressure, there is a fear that the inside of the pipe laying or the inside of the ion source will be oxidized. Therefore, heating is typically executed in the high vacuum state.

In a conventional mass analysis system serving as a chemical analysis system, the necessity for reducing the electric power and the start time mainly in the system of installation type is not great. At the time of start, it is typical that a vacuum exhaust device is initialized and then processing such as various kinds of heating is executed. Thus in the mass analysis system serving as a conventional chemical analysis system, various kinds of heating is executed after vacuum exhaust. Therefore, the start time becomes long because of heating requiring the longest time.

In the conventional typical transportable analysis system, initialization of the system is effected by using a method similar to that of the system of installation type. The reason will now be described. In the analysis system, it is necessary to analyze the detection subject substance with high precision. If analysis is not executed when a sufficient high vacuum state is achieved by the vacuum exhaust, a measurement result might depend upon impurities contained in the atmosphere.

In a transportable explosive detection system, it is necessary to start rapidly the system after a movement of the system and effect detection. In addition, it is necessary to suppress the maximum electric power in order to use the system with an ordinary home power supply.

SUMMARY OF THE INVENTION

An object of the present invention is to provide a transportable explosive detection system using a mass analysis system, and provide a transportable system of low electric power capable of simply moving, rapidly executing a measurement after the movement, and being used with an ordinary home power supply.

A mass analysis system used in the exclusive detection system of the present invention is small-sized and transportable, and it can be used with an ordinary home power supply. In the transportable explosive detection system (hereafter simply referred to as detection system), the electric power is suppressed and start is effected in a short time by first heating an absorption region for absorbing vapor from a detection subject substance, an absorption pipe laying for coupling the absorption region to an ion source, and the ion source with full power, then stopping heating of respective regions, bringing them into a warmth keeping state, and then starting vacuum exhaust devices. Each vacuum exhaust device requires greatest electric power at the beginning of start. In order to suppress the electric power of the whole detection system, a plurality of vacuum exhaust devices used in the detection system are started with start beginning times shifted. In addition, heaters for heating the respective regions are heated again by using left power of vacuum exhaust electric power for driving the vacuum exhaust devices. When the exhaust of the vacuum exhaust devices has reached a stationary state, the absorption region, the absorption pipe laying, and the ion source are heated again. By efficiently controlling the heating of respective regions of the detection system, the start time of the detection system as a whole is shortened.

Other objects, features and advantages of the invention will become apparent from the following description of the embodiments of the invention taken in conjunction with the accompanying drawings.

DESCRIPTION OF THE EMBODIMENTS

The present invention relates to a detection system for detecting explosives such as hazardous materials and narcotics. The detection system of the present invention effects detection to determine whether there is an explosive such as a hazardous material and a narcotic contained in a baggage, freight, or mail, or carried by a person or an animal. In order to determine whether there is a narcotic or whether there is a hazardous material dispersed by an accident or a disaster or determine whether there is an artificially sprinkled hazardous material, the detection system of the present invention samples vapor generated from an inspection subject, and detects an infinitesimal substance with a predetermined precision. When effecting a detection inspection to be conducted emergently, it is important to quickly determine whether there is an explosive by a measurement with a predetermined precision maintained rather than a measurement with a high precision. Therefore, the detection system of the present invention has a configuration in which the system is efficiently started with low electric power and in a short time to effect a measurement. In addition, a mass analysis system used in the detection system of the present invention can be used also as an ordinary mass analysis system serving as a chemical analysis system.

In the detection system of the present invention, heating time requiring a long time is shortened by first heating an absorption region for absorbing vapor from a detection subject substance, absorption pipe laying for coupling the absorption region to an ion source, and the ion source, then maintaining these regions in a warmth keeping state, driving a plurality of vacuum exhaust devices in order, effecting vacuum exhaust, and heating the regions again. Furthermore, by controlling electric power for heating the above-stated regions, each of the regions is heated within a range of maximum electric power. Thus, each of the regions arrives at a predetermined temperature efficiently in a short time, and the start time of the whole detection system is shortened.

The detection system of the present invention can be started with low electric power in a short time. Therefore, the detection system of the present invention is suitable for inspection of a baggage or freight in an airport or a harbor, inspection of mail in a post office, inspection of a baggage in baggage collection and delivery facilities, and inspection for effecting detection to determine whether a person or an animal carries an explosive. Hereafter, embodiments of the present invention will be described in detail with reference to the drawings.

(First Embodiment)

Figure 1A:
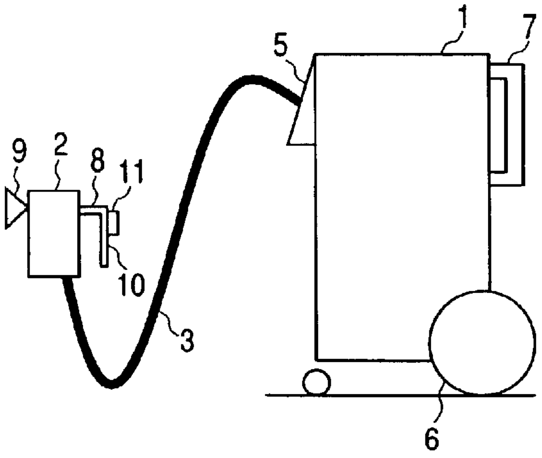
FIG. 1(A) is a side view showing an exterior view of a detection system of vertical type in a first embodiment according to the present invention.
Figure 1B:
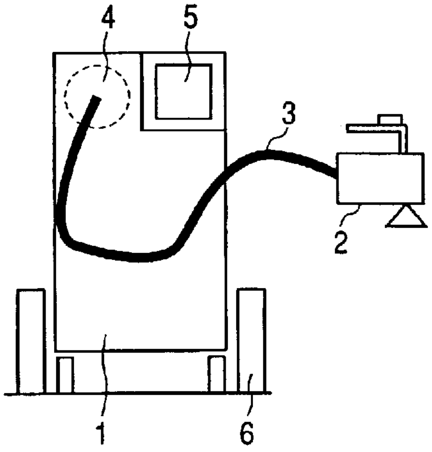
FIG. 1(B) is a front view showing an exterior view of a detection system of vertical type in a first embodiment according to the present invention.

FIGS. 1(A) and 1(B) are diagrams showing an exterior view of a vertical detection system in a first embodiment of the present invention. FIG. 1(A) is a side view, and FIG. 1(B) is a front view. The detection system of the first embodiment includes a system main body (mass analysis system) 1 of the detection system, a mass analysis region 4 disposed in the system main body 1, an absorption region 2 for absorbing and collecting vapor from a detection subject substance, and an absorption pipe laying 3 for supplying vapor of the detection subject substance absorbed by the absorption region 2 to an ion source of the system main body 1.

The system main body 1 has a touch panel control screen 5 or a computer. Respective regions of the detection system are controlled by commands issued from the control screen 5 or the computer. The system main body 1 has a movement tire 6 made of rubber, and the system main body 1 can be moved. The system main body 1 can get over a difference in level of some degree by using the rubber tire. However, any other configuration, such as a configuration using a tender tire or a configuration for floating the system main body 1 with an air pressure, an electromotive handcart, or a self-propelled tire, may be used so long as it is freely movable. In the first embodiment, at least two fixed large rubber tires and two casters that can be changed in direction are used.

Since a main body handle 7 is disposed on the system main body 1, operation at the time of movement is facilitated. In addition, the movement with reduced force is facilitated by holding down the weight of the system main body 1. The detection system of the first embodiment has a size that can be mounted on a loading platform of a truck, and it can be also moved over a long distance. It is also possible to produce a dedicated car for mounting the detection system of the first embodiment and move the detection system thereby.

The detection system of the first embodiment can operate with electric power of 100 V and 15 A of an ordinary home outlet in Japan. The detection system of the first embodiment may be use with a dedicated power supply instead of the home power outlet. The detection system of the first embodiment can be used not only in a predetermined place where it is permanently installed but also in a place where it is moved at the time of emergency. When the detection system of the first embodiment is moved and used at the time of emergency, it can be used without installing new dedicated power supply equipment in the place where it has been moved. In the case where the detection system of the first embodiment is used in an overseas region other than Japan, there is used one produced according to specifications whereby it can be operated with home electric power in that region.

The absorption region 2 includes an absorption region handle 8 to be grasped by a hand, a gas inlet 9 for absorbing vapor from a detection subject substance, an operation region 10 for ordering start and end operation of absorbing vapor from the detection subject substance, and an indication region 11 for indicating the absorption state of vapor from the detection subject substance (flow of vapor of the detection subject substance) and a result of a measurement effected in the detection system. The operation region 10 and the indication region 11 are disposed on the absorption region handle 8. A rough filter for preventing mixture of an alien substance is disposed on the gas inlet 9. On the absorption pipe laying 3, there is disposed a heater for effecting heating in order to prevent impurities from being adsorbed into the inside of the absorption pipe laying 3. Since the temperature becomes high at the time of heating, the absorption pipe laying 3 is covered with a thermal insulation of a sufficient thickness for the purpose of insulation. Furthermore, in order to freely move the absorption region 2, a flexible tube is used as the absorption pipe laying 3.

As an optional configuration of the absorption region 2, there may be adopted a configuration in which the absorption region 2 is fixed to the system main body 1 and a baggage or a letter is brought close to the absorption region 2 to effect detection, or a configuration in which a sample absorbed and collected by wiping or by using a vacuum cleaner is absorbed directly by the absorption region 2, or heated and then absorbed by the absorption region 2. Furthermore, the absorption region 2 may be combined with an explosive detection system such as an X-ray imaging detection system, a security gate, or mail and baggage collection and delivery facilities to effect detection. Any combination of the absorption region 2 with a system capable of collecting gas, liquid, or solid may be used. The sample collected by the absorption region 2 is sent to the system main body 1 via the absorption pipe laying 3 and analyzed.

Figure 2A:
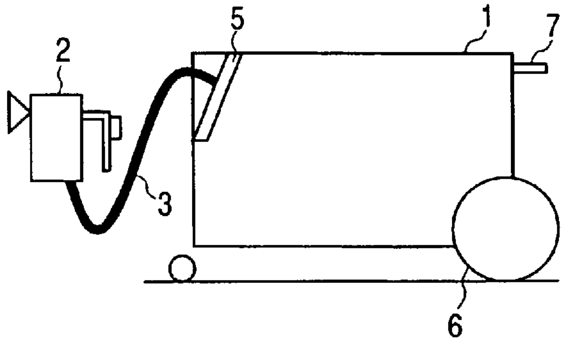
FIG. 2(A) is a side view showing an exterior view of a detection system of horizontal type in a first embodiment according to the present invention.
Figure 2B:
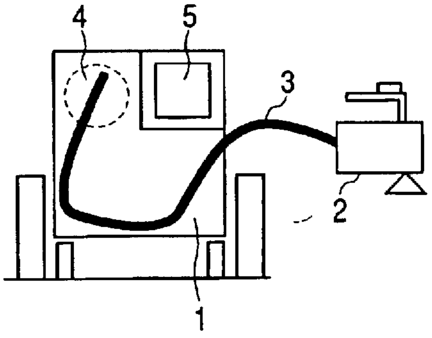
FIG. 2(B) is a front view showing an exterior view of a detection system of horizontal type in a first embodiment according to the present invention.

FIGS. 2(A) and 2(B) are diagrams showing exterior views of a horizontal detection system of a first embodiment according to the present invention. FIG. 2(A) is a side view, and FIG. 2(B) is a front view. The detection system shown in FIGS. 2(A) and 2(B) is obtained by making the detection system shown in FIGS. 1(A) and 1(B) horizontal. The detection system shown in FIGS. 2(A) and 2(B) is held down in height so as to be lower than the detection system shown in FIGS. 1(A) and 1(B). In the example of an external shape as shown in FIGS. 2(A) and 2(B), the detection system can be easily mounted on a truck, and the space can be efficiently used by placing the detection system under a desk.

Figure 3:
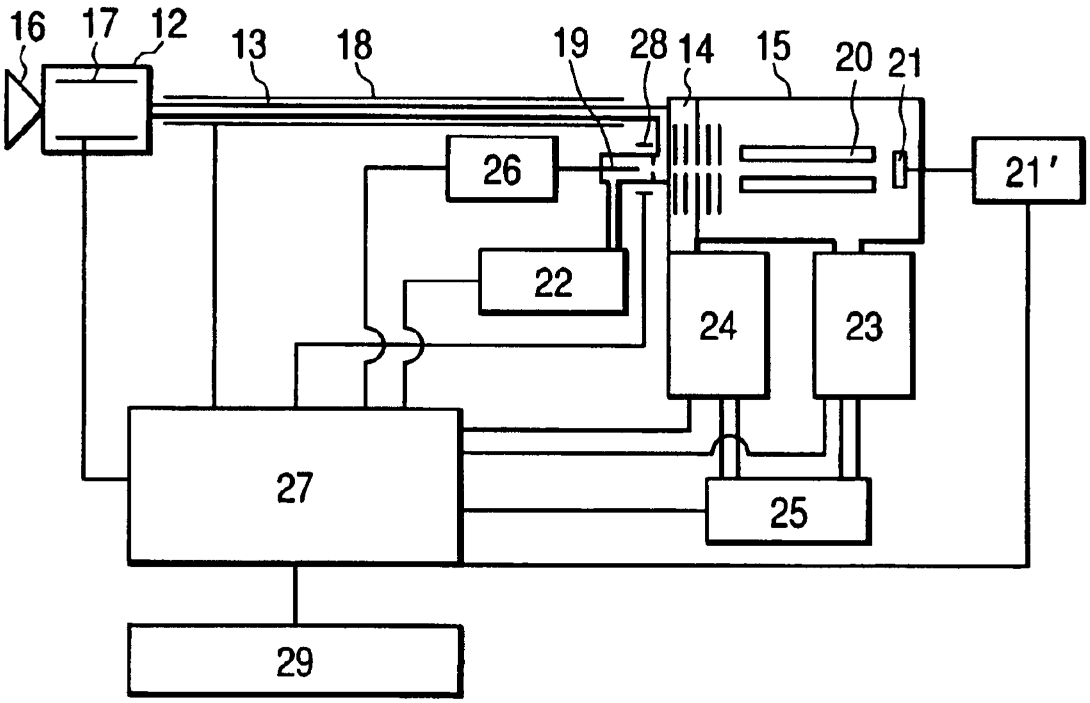
FIG. 3 is a diagram showing a configuration of a detection system in a first embodiment according to the present invention.

FIG. 3 is a diagram showing a configuration of the detection system of the first embodiment according to the present invention. FIG. 3 is a diagram showing a detailed configuration of the detection system shown in FIGS. 1(A) and 1(B) or FIGS. 2(A) and 2(B). Main components of the detection system are an absorption region 12, an absorption pipe laying 13, an ion source 14, and a vacuum chamber 15. Gas, liquid and solid, such as vapor and particulates, generated from a detection subject substance are absorbed efficiently from a gas inlet 16 of the absorption region 12. Inside the absorption region 12 is sufficiently heated by an absorption region heater 17 in order to prevent adsorption. The absorbed vapor and particulates are injected into the ion source 14 through the absorption pipe laying 13. The absorption pipe laying 13 is heated sufficiently by a pipe laying heater 18.

As the ion source 14, an atmospheric pressure chemical ionization source with counter-flow introduction (the third conventional art: JP-A-2001-093461) is used. A needle electrode 19 is disposed on the atmospheric pressure chemical ionization source. The needle electrode 19 conducts corona discharge and generates primary ions such as oxygen. The primary ions ionize vapor of the absorbed detection subject substance by a chemical reaction and generate secondary ions. The secondary ions are injected into vacuum through an orifice. Only a specific mass is selected by a quadrupole electrode 20, led to a detector 21, detected by a detector circuit 21', and subjected to mass analysis. By selecting primary ions, only a specific ingredient can be converted to secondary ions. Therefore, a measurement with a high sensitivity is possible.

In the detection system of the first embodiment, sample gas is flown in a direction by an absorption pump 22 so as to be opposed to the needle electrode 19. As a result, ingredients that obstruct ionization can be excluded, and the ionization efficiency is further improved. For injecting the secondary ions ionized under the atmospheric pressure into the detector 21 in vacuum, differential exhaust is needed. In the vacuum chamber 15, differential exhaust is conducted by two turbo molecular pumps, i.e., a first turbo molecular pump 23 and a second turbo molecular pump 24, and further exhaust is conducted by a rotary pump 25. Other combinations other than the combination of these exhaust pumps are also possible. For example, since turbo molecular pumps are extremely easily affected by vibration, movement is impossible when the detection system is running. By replacing the turbo molecular pumps with oil diffusion pumps, movement becomes possible even when the detection system is running. Turbo molecular pumps enhanced in vibration resisting durability may also be used. The differential exhaust may be conducted by one turbo molecular pump having a high exhaust capability.

In the detection system of the first embodiment, the small-sized quadrupole type is used for mass analysis. However, a small-sized ion-trap system or a mass analysis system of magnetic field type may also be used. Furthermore, analysis of a tandem system (MS/MS) is also possible by using a two-stage quadruple configuration or an ion-trap system.

An APCI power supply 26 serving as a power supply of the ion source 14, power supplies of the quadruple electrode 20 and the needle electrode 19, the absorption region heater 17, the pipe laying heater 18, an ion source heater 28, and the exhaust devices of the vacuum chamber 15 (the first turbo molecular pump 23, the second turbo molecular pump 24 and the rotary pump 25) are controlled by a controller 27. The controller 27 is controlled by an operation panel or outside computer 29 by using an internal program.

Figure 4:
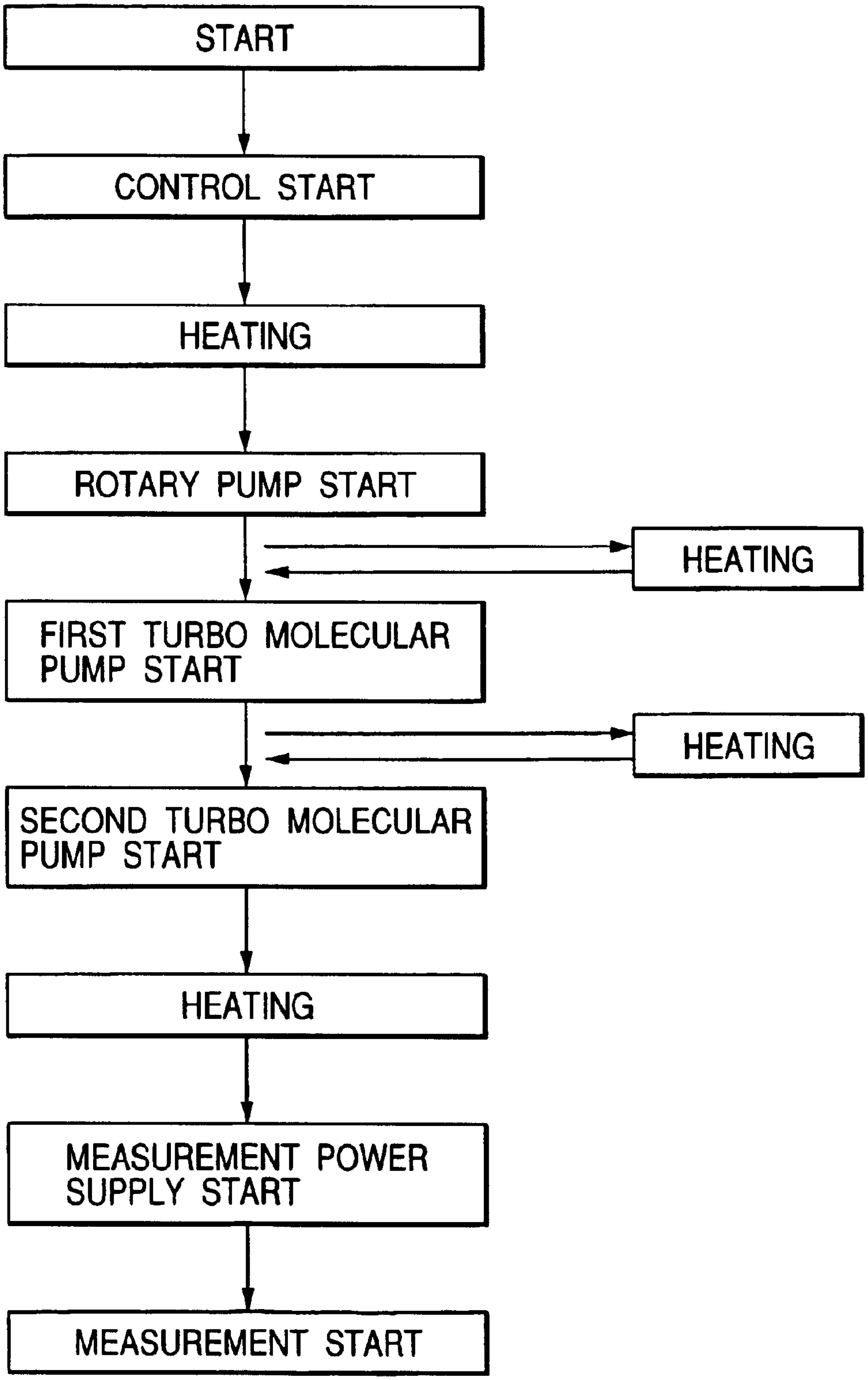
FIG. 4 is a flow chart showing an example of a starting method of a detection system in a first embodiment according to the present invention.

FIG. 4 is a flow chart showing an example of a start method of the detection system in the first embodiment according to the present invention.

Upon beginning of the start of the detection system, a control system is first started and a power supply of the controller 27 is initialized. Subsequently, heating of respective regions is conducted. The absorption region 12 is heated to a temperature of at least 150° C. by the absorption region heater 17. The absorption pipe laying 13 is heated to a temperature of at least 150° C. by the pipe laying heater 18. The ion source 14 is heated to a temperature of at least 150° C. by the ion source heater 28. The heating is stopped temporarily, and the warmth keeping state is maintained. At this time, the absorption region 12, the absorption pipe laying 13, and the ion source 14 are cleaned by setting the temperature to a value (for example, a value in the range of 250° C. to 300° C.) slightly higher than an ordinary temperature in use (for example, in the range of 200° C. to 250° C.).

During the warmth keeping state, initialization of the exhaust system is conducted. Electric power of pumps is the greatest immediately after they have been started. When a plurality of pumps are simultaneously started, therefore, instantaneous electric power of the pumps at the time of start is so high as to exceed predetermined electric power in some cases. In the detection system of the first embodiment, the rotary pump 25 is first started, and the first turbo molecular pump 23 is started after the exhaust conducted by the rotary pump 25 has reached a stationary state. After the exhaust conducted by the first turbo molecular pump 23 has reached a stationary state, the second turbo molecular lamp 24 is started. In this way, a plurality of exhaust pumps are started with a time difference by stages. The controller 27 conducts control so that the exhaust devices will be started with a time difference and the whole electric power will not exceed prescribed electric power. Especially when home electric power is used as the power supply, the controller 27 conducts control so that 100 V and 15 A will not be exceeded.

By supplying electric power to the absorption region heater 17, the pipe laying heater 18, and the ion source heater 28 in order to heat the absorption region 12, the absorption pipe laying 13 and the ion source 14 respectively after the exhaust conducted by each pump has reached a stationary state, the time required for heating respective regions can be further shortened. After respective regions have been heated enough to detect explosives, power supplies for measurement, such as the APCI power supply 26 and the power supplies of various electrodes, are started and a measurement is started. An example of a change of electric power in the start method heretofore described is shown in FIG. 5.

Figure 5:
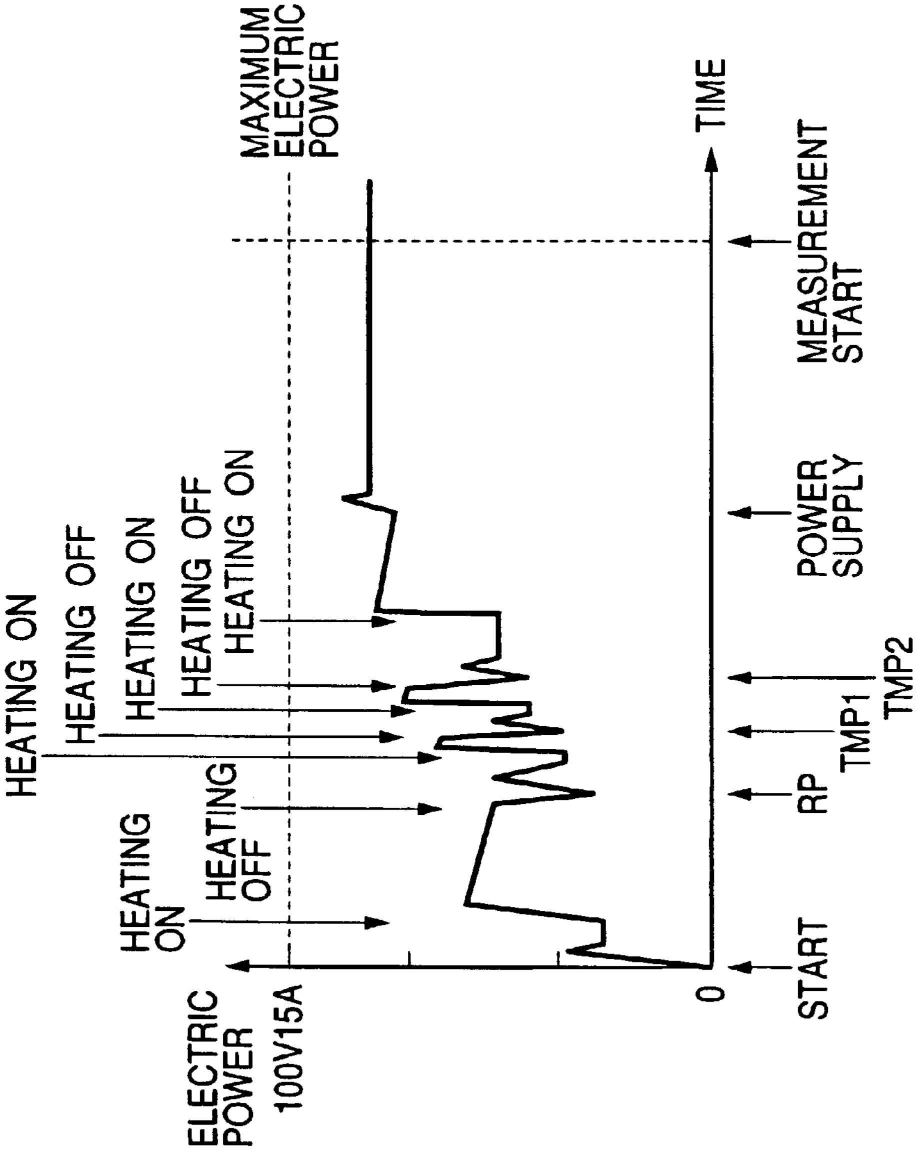
FIG. 5 is a diagram showing an example of a change of electric power in a first embodiment according to the present invention.

FIG. 5 is a diagram showing an example of a change of electric power in the first embodiment of the present invention.

Upon beginning of start of the detection system, the controller 27 first consumes electric power mainly. Subsequently, heating of the absorption region heater 17, the pipe laying heater 18, and the ion source heater 28 is started (heating ON). Heating is temporarily stopped and the warmth keeping state is maintained (heating OFF). Subsequently, pumps are started in order so that the whole electric power involving an increase of the electric power at an early stage of the start will not exceed the maximum electric power. In other words, the rotary pump 25 is started at a time point RP, and the first turbo molecular pump 23 is started at a time point TMP1. The second turbo molecular pump 24 is started at a time point TMP2. Especially the vacuum exhaust takes a long time. As for the start of the turbo molecular pumps 23 and 24 as well, it takes several minutes until stationary rotation is reached through accelerated rotation.

While the exhaust conducted by each pump is in a stationary state, heating of the absorption region 12, the absorption pipe laying 13, and the ion source 14 may also be executed. In the example shown in FIG. 5, heating of a moment is executed while the exhaust conducted by the rotary pump 25 is in a stationary state. When the exhaust conducted by the pumps has reached the stationary state, heating of the absorption region 12, the absorption pipe laying 13, and the ion source 14 is executed. Since the absorption region 12, the absorption pipe laying 13, and the ion source 14 are in the warmth keeping state raised in temperature to some degree by initial heating, the time required for each region to arrive at the ordinary temperature in use can be made short. Subsequently, various power supplies, such as the APCI power supply 26 and the power supplies of various electrodes, are started to prepare for a measurement. In a state in which various power supplies have become stable, a measurement of a sample absorbed by the absorption region 12 is started.

In an ordinary analysis system, it takes the longest time to raise the temperature because heating is conducted after the exhaust. In the detection system of the first embodiment, however, heating of the absorption region 12, the absorption pipe laying 13, and the ion source 14 is first executed, and they are temporarily brought into the warmth keeping state. Thereafter, a vacuum exhaust device is started, and respective regions are heated again from the state that the warmth is kept and the temperature is raised. The total rise time of the detection system can be shortened than the ordinary analysis system. In other words, the rise time can be shortened by controlling the heating electric power of respective regions in current, voltage or electric power and heating each region within a range of the maximum electric power.

(Second Embodiment)

In the first embodiment, heating electric power of the above-stated regions is controlled in current, voltage or electric power. In a second embodiment, the start time is shortened by controlling the heating electric power of the respective regions and thereby increasing the heating efficiencies of the respective regions while suppressing the electric power.

Figure 6:
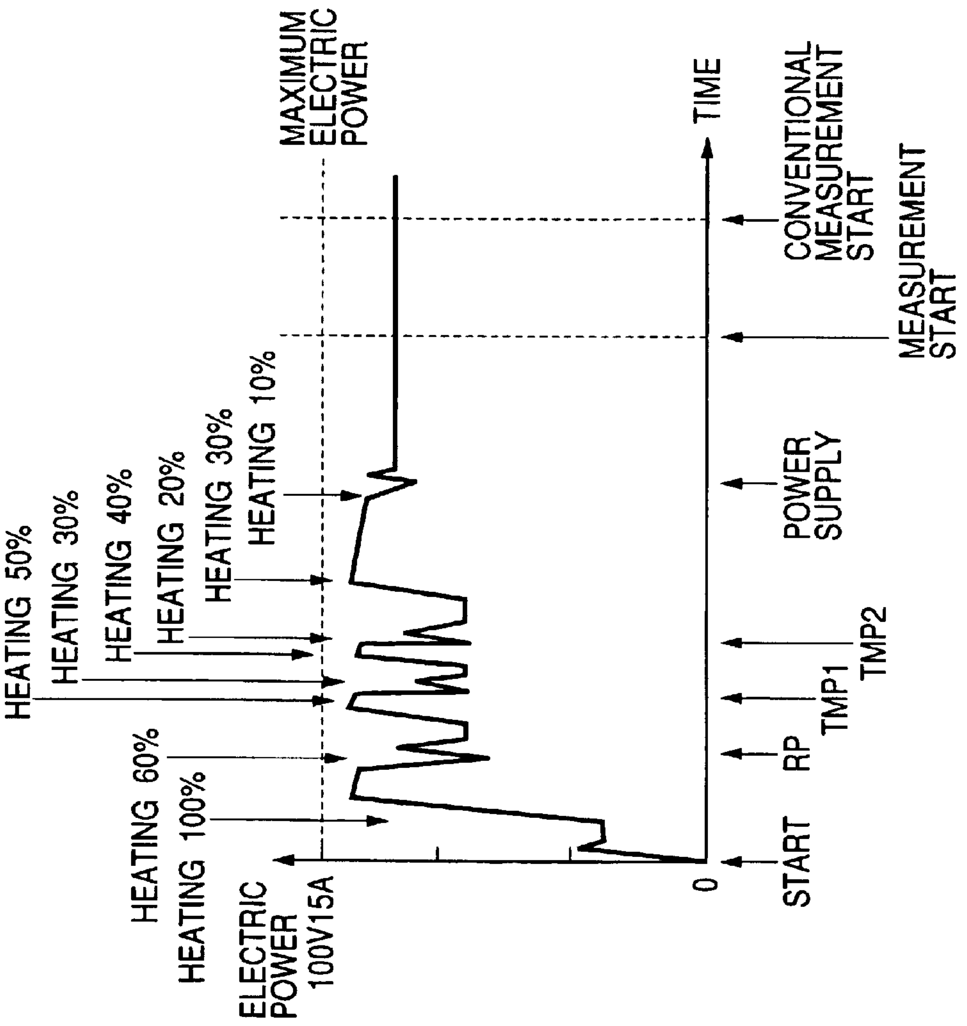
FIG. 6 is a diagram showing an example of a change of electric power in the case where electric power is controlled in a second embodiment according to the present invention.

FIG. 6 is a diagram showing an example of a change of electric power in the case where electric power is controlled in the second embodiment of the present invention. Upon beginning of start of the detection system, the controller 27 first consumes electric power mainly. Subsequently, heating of the absorption region heater 17, the pipe laying heater 18, and the ion source heater 28 is started (heating ON). Heating is conducted with full power 100% of a degree that does not exceed the maximum electric power. Heating is temporarily stopped and the warmth keeping state is maintained (heating OFF).

Subsequently, the rotary pump 25 is started at a time point RP, and the first turbo molecular pump 23 is started at a time point TMP1. The second turbo molecular pump 24 is started at a time point TMP2. When each pump is started, however, heating electric power reduced by the electric power required for the pump is supplied to the absorption region heater 17, the pipe laying heater 18 and the ion source heater 28. As a result, the total electric power of the detection system does not exceed the maximum electric power.

In the example shown in FIG. 6, heating and cleaning of the absorption region 12, the absorption pipe laying 13, and the ion source 14 are conducted with heating electric power of 100% and at a temperature (for example, 250° C. to 300° C.) higher than the ordinary temperature in use (for example, 200° C. to 250° C.), after the start. In order to start the rotary pump 25, the heating electric power is dropped to 60% and heating is continued. At this time, heating electric power of each region is set so that electric power will not exceed the maximum electric power when the rotary pump 25 is started. While the exhaust is in the stationary state after the start of the rotary pump 25, the above-stated respective regions are heated with heating electric power of 50% again and then heating electric power of 30% of the respective regions is lowered to 30%. Heating electric power of the respective regions is also set so that electric power will not exceed the maximum electric power when the first turbo molecular pump 23 is started. After the exhaust conducted by the first turbo molecular pump 23 has reached a stationary state, the heating electric power of the respective regions is set to 40% again and then lowered to 20%. Subsequently, the second turbo molecular pump 24 is started. After the exhaust has reached a stationary state, the respective regions are heated with heating electric power of 30% again. If a state in which a measurement can be effected is sufficiently reached, the respective regions are always heated with heating electric power of 10%. Subsequently, various power supplies are started and a measurement is started. In the second embodiment, heating electric power is supplied to respective regions to be heated, at its maximum to such a degree that the electric power will not exceed the maximum electric power, by controlling the heating electric power. As a result, the start time can be shortened as compared with the first embodiment.

In the second embodiment, the timing at which heating electric power of the respective regions to be heated is controlled, and the control method of heating electric power are exemplary. As a matter of fact, they vary according to start electric power of the exhaust pump used in the detection system and electric power of various power supplies. Control of heating electric power of the respective regions to be heated is conducted by a controller. It is possible to adopt a start method conformed to a power supply capability of a place where the detection system is used, by subtly changing the heating electric power of respective regions according to the place where the detection system is used. Furthermore, the result is stored and learned. If the maximum electric power is exceeded and start cannot be effected, then heating electric power is lowered in the next start in order to effect the start certainly. In addition, heating electric power of respective regions can also be controlled most efficiently by monitoring the electric power of the detection system.

Among the absorption region 12, the absorption pipe laying 13, and the ion source 14, the absorption region 12, which absorbs cold air, is hardest to rise in temperature. By setting the temperature of the absorption region 12 higher than that of other regions, therefore, warmer air flows into the absorption pipe laying 13 and the ion source 14. As a result, the heating efficiency of the absorption pipe laying 13 and the ion source 14 is improved.

As an example of heating control, there is a method of lowering the electric power by using two heaters of 200 W for the absorption pipe laying 13. At the time of first heating in this method, heating is conducted by using two heaters with a total of 400 W. When starting an exhaust device, heating is conducted by using one heater of 200 W. Furthermore, besides the control of conducting heating simultaneously on the heaters 17, 18 and 28 respectively of the absorption region 12, the absorption pipe laying 13, and the ion source 14, there may be conducted control of shifting the heating time of the heaters 17, 18 and 28 respectively of the absorption region 12, the absorption pipe laying 13, and the ion source 14, conducting heating in different intervals, and thereby reducing the total electric power.

(Third Embodiment)

As described in the first and second embodiments, it takes a longest time in the detection system to heat the heaters 17, 18 and 28 respectively of the absorption region 12, the absorption pipe laying 13, and the ion source 14. In a third embodiment, therefore, the heaters 17, 18 and 28 are always subject to preliminary heating in a state where the detection system is not used and when the detection system is being moved. For example, when the detection system is mounted on a transportation car and transported, the heaters 17, 18 and 28 are always subject to preliminary heating using the electric power of a power supply of the transportation car during the transportation. As a result, the measurement start time of the detection system after the conveyance can be advanced. Power may be supplied from an internal battery or an external battery to the heaters 17, 18 and 28. Since the heaters 17, 18 and 28 are always subject to preliminary heating even in the case where the detection system is not yet used, it is possible to quickly bring the detection system into a measurable state at the time of emergency as well.

(Fourth Embodiment)

The detection system of the present invention is capable of absorbing and detecting explosives on line at high speed. In the fourth embodiment, there will be described an example of indicating a discrimination result on the absorption region 2, searching for a part where the generated gas concentration is high, and discriminating the gas generation source. As shown in FIGS. 1(A) and 1(B) and 2(A) and 2(B), the detection system of the present invention has the absorption region 2 the operator can freely move. On the absorption region 2, there are disposed the operation region 10 for ordering start and end operation of absorbing gas, and the indication region 11 for indicating the absorption state of gas (flow of gas) and a result of a measurement effected in the detection system. The operator conducts necessary operation on the operation region 10 when detection is desired, and a result of the measurement effected in the system main body 1 is indicated on the indication region 11. While watching the indication region 11, an operator such as a guard operates the detection system. It is possible to bring the absorption region 2 directly close to an especially doubtful part or an often hiding part. Not only it is determined whether there is an explosive, but also a visual indication of a numerical value of a detection result or a bar indication is conducted on the indication region 11 and an inspection part having a higher numerical value can be judged to be a part having a high vapor concentration of a detection subject substance (i.e., the probability that the detection subject substance will exist in the part is high). When investigating a person, it is possible to determine in which part of the person the detection subject substance exists by using the absorption region 2.

(Fifth Embodiment)

In a fifth embodiment, various sensors are used, and judgment of maintenance time of the detection system and system control of the detection system are conducted on the basis of results of measurements of various sensors. In the case where vacuum exhaust pumps having no earthquake resistance are used, the system main body 1 in the detection system of the present invention cannot be moved in a state in which the detection system is running. In order to prevent the detection system from being started by mistake while the system main body 1 is moving or prevent the system main body 1 from being moved while the detection system is being started, therefore, the state of the system main body 1 is always monitored by using various sensors such as s rotary sensor in the tire portion. The sensors may be disposed not only on the tire portion but also on the system main body 1. The detection system is prevented from being moved by the sensors at the time of running. Furthermore, it is also possible to prevent the exhaust pumps from being started while the detection system is being moved. In other words, it is possible in the detection system of the fifth embodiment to prevent false operation of the operator by using output signals of sensors for effecting detection to determine whether the system main body 1 of the detection system is moving.

If the detection system of the present invention is used over a long time, then impurities adhere to filters disposed on the absorption region 2, the absorption pipe laying 3 (13), the ion source 14, and the gas inlets 9 and 16, resulting in increased background and a worsened sensitivity. The background can be recovered by replacing the filters disposed on the absorption region 2 and the absorption pipe laying 3 (13), or heating and cleaning the absorption region 2, the absorption pipe laying 3 (13), and the ion source 14 at a temperature higher than an ordinary temperature in use. The detection system of the fifth embodiment has a function of anticipating replacement times of the filters disposed on the absorption region 2 and the absorption pipe laying 3 (13) by using various sensors and measurement results and warning the operator, or a function of automatically heating and cleaning. The operator effects replacement in response to the warning.

For example, in the case of a filter, the pressure in the absorption pipe laying 3 is monitored by a pressure sensor. If the pressure has dropped, loading of the filter can be considered. In this case, air is flown with a predetermined flow to the filter in a direction opposite to the absorption direction, or heating is conducted at a temperature higher than the ordinary temperature in use. Or automatic replacement is conducted, or indication is effected to urge the replacement.

Adsorption in pipe laying is judged from an increase of the background, and cleaning is automatically conducted at a temperature higher than the ordinary temperature in use. If recovery is not effected even by the automatic cleaning, then indication is effected to urge the replacement. There is provided a function of not only indicating the necessity of replacement at the time of replacement but also anticipating the time of replacement beforehand and indicating the anticipated time.

The system main body 1 obtained by removing a sample injection region (the absorption regions 2 (12) and the absorption pipe laying 3 (13)) from the detection system of the present invention can be used also as an ordinary mass analysis system serving as a chemical analysis system. By conducting the heating control of the ion source heater 28 and drive control of respective exhaust devices in the same way as the foregoing description, the rise time of the ordinary mass analysis system serving as a chemical analysis system can be shortened.

Hereafter, features of the explosive detection system of the present invention are summarized.

A first configuration of an explosive detection system according to the present invention includes a sample injection region, an ion source region for generating ions of a sample injected by the sample injection region, a mass analysis region for analyzing mass of the ions, a heater for heating the sample injection region and the ion source region, a plurality o pumps for exhausting a chamber in which the mass analysis region is disposed, and a controller for controlling the regions and the plurality of pumps. The controller conducts control so as to heat the sample injection region and the ion source region with the heater, then reduce heating electric power supplied to the heater in order to prevent a predetermined electric power value from being exceeded, and drive the plurality of pumps successively to exhaust the chamber.

In the first configuration, the sample injection region and the ion source region are heated preliminarily by the heater in a state in which the explosive detection system is not yet used. While the explosive detection system is mounted on a transportation car and transported, the sample injection region and the ion source region are heated preliminarily by the heater with electric power of a power supply of the transportation car. Furthermore, the explosive detection system can be started with home electric power, and can be started with electric power of 100 V and 15 A. After the exhaust conducted by the pumps has reached a stationary state, the controller conducts control so as to heat the sample injection region and the ion source region with the heater. At this time, the sample injection region and the ion source region are simultaneously heated by the heater, or heated by the heaters in different intervals. The sample injection region includes an absorption region for absorbing vapor from a detection subject substance, an absorption pipe laying for coupling the absorption region to the ion source, a handle disposed on the absorption region, an operation region disposed on the handle, and an indication region disposed on the handle. Start operation and end operation of absorption of vapor from the detection subject substance are ordered by the operation region, and a result of a measurement is indicated on the indication region. The explosive detection system includes a sensor for conducting detection to determine whether a main body region of the explosive detection system is in a state of movement.

A second configuration of an explosive detection system according to the present invention includes a simple injection region, an ion source region for generating ions of a sample injected by the sample injection region, a mass analysis region for analyzing mass of the ions, a first heater for heating the sample injection region, a second heater for heating the ion source region, a plurality of pumps for exhausting a chamber which the mass analysis region is disposed, and a controller for controlling the regions and the plurality of pumps. The controller conducts control so as to heat the sample injection region with the first heater and the ion source region with the second heater, then reduce heating electric power supplied to the first and second heaters in order to prevent a predetermined electric power value from being exceeded, and drive the plurality of pumps successively to exhaust the chamber.

In the second configuration, the sample injection region is heated preliminarily by the first heater and the ion source region is heated preliminarily by the second heater in a state in which the explosive detection system is not yet used. The explosive detection system can be started with electric power of 100 V and 15 A. The sample injection region includes an absorption region for absorbing vapor from a detection subject substance, an absorption pipe laying for coupling the absorption region to the ion source, a handle disposed on the absorption region, an operation region disposed on the handle, and an indication region disposed on the handle. Start operation and end operation of absorption of vapor from the detection subject substance are ordered by the operation region, and a result of a measurement is indicated on the indication region. Furthermore, after the exhaust conducted by the pumps has reached a stationary state, the controller conducts control so as to heat the sample injection region with the first heater and the ion source region with the second heater. At this time, the sample injection region and the ion source region are simultaneously heated, or heated in different intervals. While the explosive detection system is mounted on a transportation car and transported, the sample injection region and the ion source region are heated preliminarily with electric power of a power supply of the transportation car. The explosive detection system includes a sensor for conducting detection to determine whether a main body region of the explosive detection system is in a state of movement.

A third configuration of an explosive detection system according to the present invention includes an absorption region for absorbing vapor from a detection subject substance, an ion source region for generating ions of the detection subject substance, an absorption pipe laying for coupling the ion source region to the absorption region, a mass analysis region for analyzing mass of the ions, a first heater for heating the absorption region, a second heater for heating the absorption pipe laying, a third heater for heating the ion source region, a plurality of pumps for exhausting a chamber in which the mass analysis region is disposed, and a controller for controlling the regions and the plurality of pumps. The controller conducts control so as to heat the absorption region with the first heater, the absorption pipe laying with the second heater, and the ion source region with the third heater, then reduce heating electric power supplied to the first, second and third heaters in order to prevent a predetermined electric power value from being exceeded, and drive the plurality of pumps successively to exhaust the chamber.

In the third configuration, the absorption region, the absorption pipe laying, and the ion source region are heated simultaneously or in different intervals. While the explosive detection system is mounted on a transportation car and transported, the absorption region, the absorption pipe laying, and the ion source region are heated preliminarily with electric power of a power supply of the transportation car. The explosive detection system can be started with electric power of 100 V and 15 A. After the exhaust conducted by the pumps has reached a stationary state, the controller conducts control so as to heat the absorption region, the absorption pipe laying, and the ion source region. The explosive detection system includes a handle disposed on the absorption region, and an indication region disposed on the handle. A result of a measurement is indicated on the indication region.

According to the present invention, there can be provided a transportable explosive detection system that uses a small-sized mass analysis system, that is transportable and can be moved easily, and that can execute a measurement concerning explosive detection quickly after the measurement. The system of the present invention can be used with an ordinary home power supply, and can be driven with low electric power. The system of the present invention can be easily moved to a place where a subject to be inspected exists, and started in a short time. The system of the present invention can efficiently execute an inspection to be conducted emergently.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An explosive detection system comprising:

a sample injection region;

an ion source region for generating ions of a sample injected by said sample injection region;

a mass analysis region for analyzing mass of the ions;

a heater for heating said sample injection region and said ion source region;

a plurality of pumps for exhausting a chamber in which said mass analysis region is disposed; and a controller for controlling the regions and said plurality of pumps;

wherein said controller conducts control so as to heat said sample injection region and said ion source region with said heater, then reduce heating electric power supplied to said heater in order to prevent a predetermined electric power value from being exceeded, and then drive said plurality of pumps successively to exhaust said chamber; and wherein, after the exhaust conducted by said pumps has reached a stationary state, said controller conducts control so as to heat said sample injection region and said ion source region with said heater.

2. The explosive detection system according to claim 1, wherein while said explosive detection system is mounted on a transportation car and transported, said sample injection region and said ion source region are heated preliminarily by said heater with electric power of a power supply of said transportation car.

3. The explosive detection system according to claim 1, wherein said explosive detection system can be started with home electric power.

4. The explosive detection system according to claim 1, wherein said explosive detection system can be started with electric power of 100 V times 15 A.

5. The explosive detection system according to claim 1, wherein said sample injection region and said ion source region are simultaneously heated by said heater.

6. The explosive detection system according to claim 1, wherein said sample injection region comprises:

an absorption region for absorbing vapor from a detection subject substance;

an absorption pipe laying or coupling said absorption region to said ion source region;

a handle disposed on said absorption region;

an operation region disposed on said handle; and an indication region disposed on said handle;

wherein start operation and end operation of absorption of vapor from the detection subject substance are ordered by said operation region; and wherein a result of a measurement is indicated on said indication region.

7. An explosive detection system comprising:

a sample injection region;

an ion source region for generating ions of a sample injected by said sample injection region;

a mass analysis region for analyzing mass of the ions;

a heater for heating said sample injection region and said ion source region;

a plurality of pumps for exhausting a chamber in which said mass analysis region is disposed; and a controller for controlling the regions and said plurality of pumps, wherein said controller conducts control so as to heat said sample injection region and said ion source region with said heater, then reduce heating electric power supplied to said heater in order to prevent a predetermined electric power value from being exceeded, and drive said plurality of pumps successively to exhaust said chamber, and wherein in a state in which said explosive detection system is not yet used, said sample injection region an said ion source region are heated preliminarily by said heater.

8. An explosive detection system comprising:

a sample injection region;

an ion source region for generating ions of a sample injected by said sample injection region;

a mass analysis region for analyzing mass of the ions;

a heater for heating said sample injection region and said ion source region;

a plurality of pumps for exhausting a chamber in which said mass analysis region is disposed; and a controller for controlling the regions and said plurality of pumps;

wherein said controller conducts control so as to heat said sample injection region and said ion source region with said heater, then reduce heating electric power supplied to said heater in order to prevent a predetermined electric power value from being exceeded, and drive said plurality of pumps successively to exhaust said chamber; and wherein said sample injection region and said ion source region are heated by said heater in different intervals.

9. An explosive detection system comprising:

a sample injection region;

an ion source region for generating ions of a sample injected by said sample injection region;

a mass analysis region for analyzing mass of the ions;

a heater for heating said sample injection region and said ion source region;

a plurality of pumps for exhausting a chamber in which said mass analysis region is disposed;

a controller for controlling the regions and said plurality of pumps; and a sensor for conducting detection to determine whether a main body region of said explosive detection system is in a state of movement;

wherein said controller conducts control so as to heat said sample injection region and said ion source region with said heater, then reduce heating electric power supplied to said heater in order to prevent a predetermined electric power value from being exceeded, and drive said plurality of pumps successively to exhaust said chamber.

10. An explosive detection system comprising:

a sample injection region;

an ion source region for generating ions of a sample injected by said sample injection region;

a mass analysis region for analyzing mass of the ions;

a first heater for heating said sample injection region;

a second heater for heating said ion source region;

a plurality of pumps for exhausting a chamber in which said mass analysis region is disposed; and a controller for controlling the regions and said plurality of pumps;

wherein said controller conducts control so as to heat said sample injection region with said first heater and to heat said ion source region with said second heater, then reduce heating electric power supplied to said first and second heaters in order to prevent a predetermined electric power value from being exceeded, and then drive said plurality of pumps successively to exhaust said chamber; and wherein, after the exhaust conducted by said pumps has reached a stationary state, said controller conducts control so as to heat said sample injection region with said first heater and to heat said ion source region with said second heater.

11. The explosive detection system according to claim 10, wherein said explosive detection system can be started with electric power of 100 V times 15 A.

12. The explosive detection system according to claim 10, wherein said sample injection region comprises:

an absorption region for absorbing vapor from a detection subject substance;

an absorption pipe laying for coupling said absorption region to said ion source region;

a handle disposed on said absorption region;

an operation region disposed on said handle; and an indication region disposed on said handle;

wherein start operation and end operation of absorption of vapor from the detection subject substance are ordered by said operation region; and wherein a result of a measurement is indicated on said indication region.

13. The explosive detection system according to claim 10, wherein said sample injection region and said ion source region are simultaneously heated.

14. The explosive detection system according to claim 10, wherein while said explosive detection system is mounted on a transportation car and transported, said sample injection region and said ion source region are heated preliminarily with electric power of a power supply of said transportation car.

15. An explosive detection system comprising:

a sample injection region;

an ion source region for generating ions of a sample injected by said sample injection region;

a mass analysis region for analyzing mass of the ions;

a first heater for heating said sample injection region;

a second heater for heating said ion source region;

a plurality of pumps for exhausting a chamber in which said mass analysis region is disposed; and a controller for controlling the regions and said plurality of pumps;

wherein said controller conducts control so as to heat said sample injection region with said first heater and to heat said ion source region with said second heater, then reduce heating electric power supplied to said first and second heaters in order to prevent a predetermined electric power value from being exceeded, and drive said plurality of pumps successively to exhaust said chamber; and wherein in a state in which said explosive detection system is not yet used, said sample injection region is heated preliminarily by said first heater and said ion source region is heated preliminarily by said second heater.

16. An explosive detection system comprising:

a sample injection region;

an ion source region for generating ions of a sample injected by said sample injection region;

a mass analysis region for analyzing mass of the ions;

a first heater for heating said sample injection region;

a second heater for heating said ion source region;

a plurality of pumps for exhausting a chamber in which said mass analysis region is disposed; and a controller for controlling the regions and said plurality of pumps;

wherein said controller conducts control so as to heat said sample injection region with said first heater and to heat said ion source region with said second heater, then reduce heating electric power supplied to said first and second heaters in order to prevent a predetermined electric power value from being exceeded, and drive said plurality of pumps successively to exhaust said chamber; and wherein said sample injection region and said ion source region are heated in different intervals.

17. An explosive detection system comprising:

a sample injection region;

an ion source region for generating ions of a sample injected by said sample injection region;

a mass analysis region for analyzing mass of the ions;

a first heater for heating said sample injection region;

a second heater for heating said ion source region;

a plurality of pumps for exhausting a chamber in which said mass analysis region is disposed;

a controller for controlling the regions and said plurality of pumps; and a sensor for conducting detection to determine whether a main body region of said explosive detection system is in a state of movement;

wherein said controller conducts control so as to heat said sample injection region with said first heater and to heat said ion source region with said second heater, then reduce heating electric power supplied to said first and second heaters in order to prevent a predetermined electric power value from being exceeded, and drive said plurality of pumps successively to exhaust said chamber.

18. An explosive detection system comprising:

an absorption region for absorbing vapor from a detection subject substance;

an ion source region for generating ions of the detection subject substance;

an absorption pipe laying for coupling said ion source region to said absorption region;

a mass analysis region or analyzing mass of the ions;

a first heater for heating said absorption region;

a second heater for healing said absorption pipe laying;

a third heater for heating said ion source region;

a plurality of pumps for exhausting a chamber in which said mass analysis region is disposed; and a controller for controlling the regions and said plurality of pumps;

wherein said controller conducts control so as to heat said absorption region with said first heater, said absorption pipe laying with said second heater, and said ion source region with said third heater, then reduce heating electric power supplied to said first, second and third heaters in order to prevent a predetermined electric power value from being exceeded, and drive said plurality of pumps successively to exhaust said chamber.

19. The explosive detection system according to claim 18, wherein said absorption region, said absorption pipe laying, and said ion source region are simultaneously heated.

20. The explosive detection system according to claim 18, wherein said absorption region, said absorption pipe laying, and said ion source region are heated in different intervals, respectively.

21. The explosive detection system according to claim 18, wherein while said explosive detection system is mounted on a transportation car and transported, said absorption region, said absorption pipe laying, and said ion source region are heated preliminarily with electric power of a power supply of said transportation car.

22. The explosive detection system according to claim 18, wherein said explosive detection system can be started with electric power of 100 V times 15 A.

23. The explosive detection system according to claim 18, wherein, after the exhaust conducted by said pumps has reached a stationary state, said controller conducts control so as to heat said absorption region, said absorption pipe laying, and said ion source region.

24. The explosive detection system according to claim 18, wherein said absorption region comprises:

a handle disposed on said absorption region; and an indication region disposed on said handle, wherein a result of a measurement is indicated on said indication region.

* * * * *